United States Patent Office 3,002,577
Patented Oct. 3, 1961

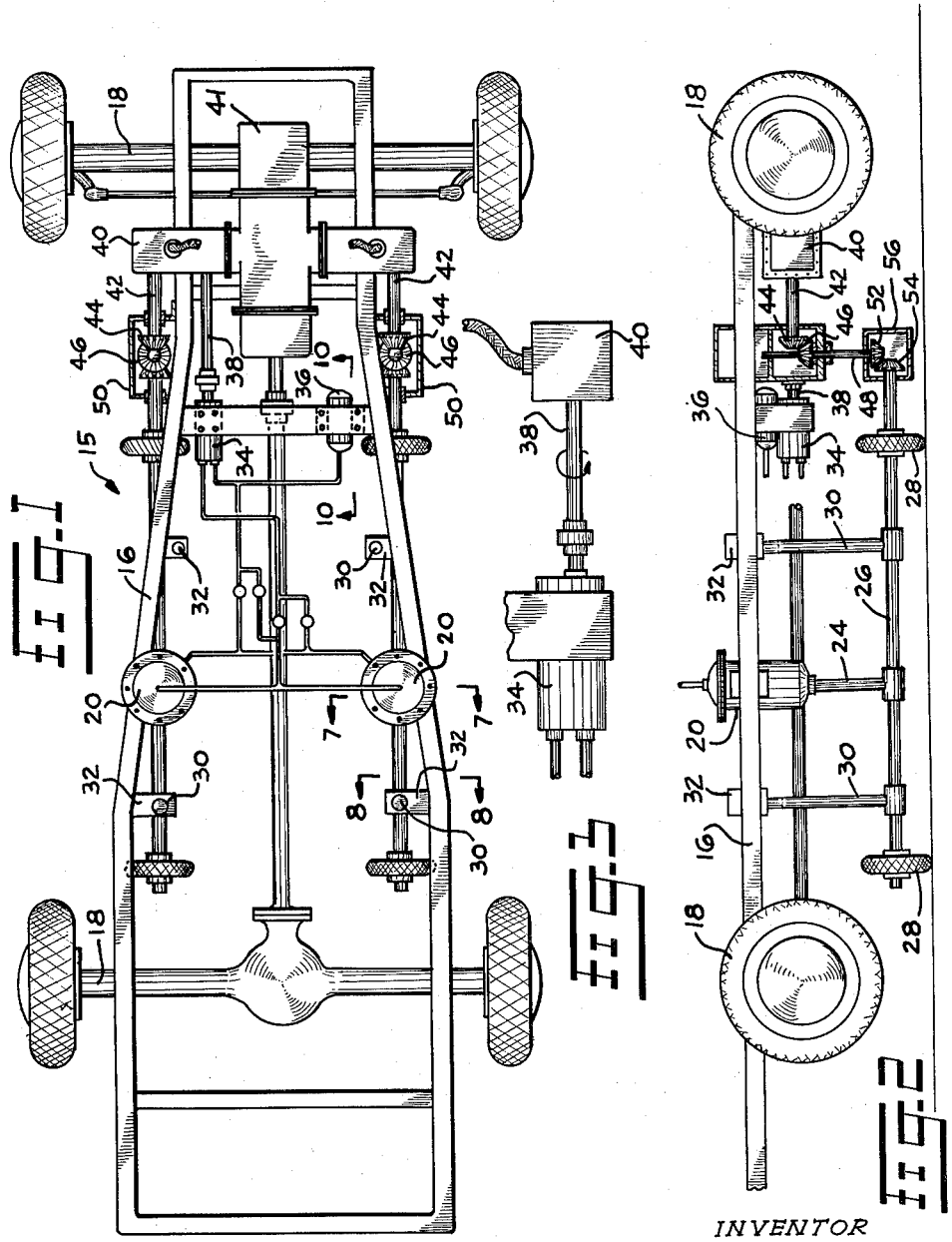

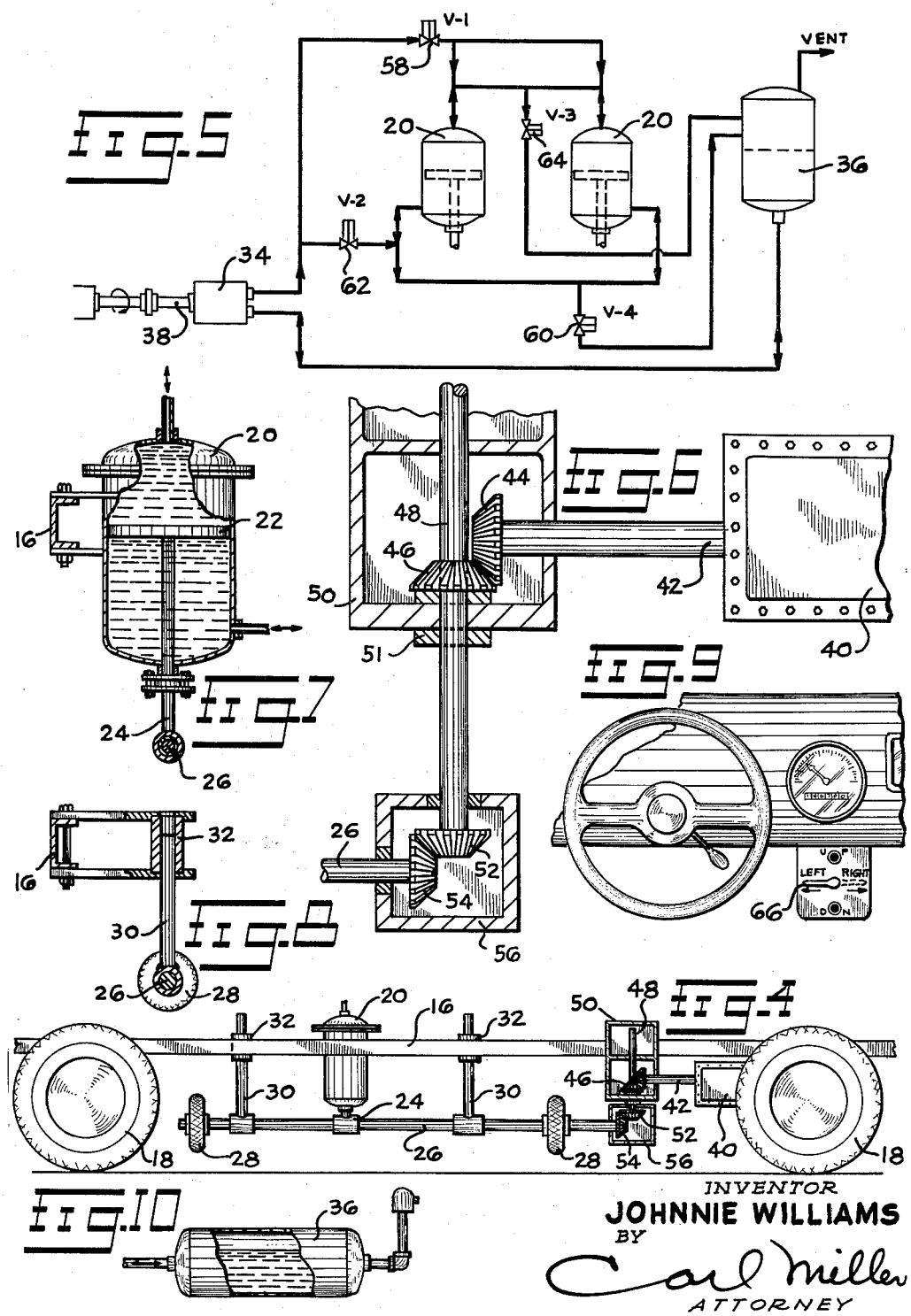

3,002,577
AUTOMATIC LIFT AND PARKING APPARATUS
Johnnie Williams, 365 W. 118th St., Apt. 18,
New York 26, N.Y.
Filed July 6, 1959, Ser. No. 825,142
3 Claims. (Cl. 180—1)

This invention relates to automotive vehicles and more particularly to an accessory therefor.

Ordinarily, it is difficult to park an automobile in close quarters. It is therefore an object of the present invention to provide a power operated lift and parking device for facilitating the parking of vehicles in all types of spaces.

Another object of the present invention is to provide an automatic type lift power parking unit for automotive vehicles that will effectively move the automobile laterally into a space of substantially the same size as the size of the vehicle.

An additional object of the present invention is to provide an automatic lift power parking assembly for use on all types of vehicles, both new and old models alike, that can be readily installed in a simple and efficient manner at a relatively low cost.

All of the foregoing and still further objects and advantages of this invention will become apparent from a study of the following specification, taken in connection with the accompanying drawing, wherein:

FIGURE 1 is a top plan view of a vehicle underframe having a parking unit made in accordance with the present invention;

FIGURE 2 is a side view, partly in section, of the assembly shown in FIGURE 1;

FIGURE 3 is a fragmentary side elevational view of certain parts of the present invention;

FIGURE 4 is a view similar to FIGURE 2, showing the vehicle in a lowered position with the assembly not in use;

FIGURE 5 is a flow diagram of the hydraulic system of the present invention;

FIGURE 6 is an enlarged fragmentary elevational view of certain gear parts forming a portion of the present invention;

FIGURE 7 is a fragmentary cross sectional view of a hydraulic chamber taken on line 7—7 of FIGURE 1;

FIGURE 8 is a fragmentary cross sectional view of bushing members forming other parts of the present invention taken on line 8—8 of FIGURE 1;

FIGURE 9 is a fragmentary plan view of the vehicle dashboard showing the control unit; and FIGURE 10 is a side elevational view, partly in section, of an oil storage chamber forming a part of the present invention taken on line 10—10 of FIGURE 1.

Referring now to the drawing, an automotive vehicle 15 having an underframe 16 and main wheel and axle assembly 18, is shown to be equipped with a parking unit made in accordance with the present invention. The parking unit includes a pair of hydraulic cylinders 20 that are secured to the opposite lateral sides of the vehicle frame 16. Each such cylinder 20 includes a piston 22 and a depending piston rod 24 that is connected to the central portion of an auxiliary wheel and axle unit including a shaft 26 and longitudinally spaced apart wheels 28. It will be noted that the wheels 28 are rollably supported for carrying the vehicle laterally of its normal path of movement. Bushings 32 carried by the frame 16 of the vehicle slidably receive guide rods 30 that are secured at their lower ends to the auxiliary shafts 26. Thus, in response to the admission and withdrawal of pressurized fluid with respect to each of the chambers 20, the piston rods 24 will selectively raise and lower the auxiliary axles 26 and wheels 28 with respect to the main frame 16.

Pressurized fluid for operating the piston rods 24 is supplied from a pump 34 that receives hydraulic fluid from a storage tank 36 through suitable connecting tubes. The pump 34 is driven by an operating shaft 38 from one of a pair of gear boxes 40 carried along side of and driven by the transmission unit 41 of the vehicle. As is more clearly shown in FIGURE 6 of the drawing, each gear box 40 further includes a longitudinally extending output shaft 42 having a bevel gear 44 in meshing engagement with another bevel gear 46 which slidably receives and drivingly rotates a vertical shaft 48 which is vertically adjustable with respect to the main frame 16 upon which the housing 50 is secured. Thus, a bushing 51 secured to a bevel gear 46 enables the bevel gear 46 to be supported at the level of the frame 16 of the vehicle so as to continuously rotate the vertical shaft 48 in all vertically extended positions thereof. The lowermost end of each vertical shaft 48 on each side of the vehicle frame is provided with a bevel gear 52 that is in meshing engagement with another bevel gear 54 secured to the adjacent end of the auxiliary axle 26, both such gears 52, 54 being enclosed within a housing 56 carried by the auxiliary axle 26.

The operation of the unit will now be readily understood. With reference now to FIGURES 5 and 9 of the drawing, it will be noted that the control handle 66 within the vehicle may be moved to any one of four different positions. When the handle 66 is moved to the up position, valves 58, 60 are opened and the other two valves 62, 64 are closed, thus controlling the flow of fluid from the pump 34 into the cylinders 20 to move the auxiliary wheel and axle assemblies downwardly into engagement with the ground, whereupon continued actuation of the pump 34 causes the vehicle to be elevated above the level of the ground. When the handle 66 is moved to the down position, the reverse procedure takes place; valves 58, 60 are closed and valves 62, 64 are opened, thus allowing the pump 34 to reverse the flow of fluid so as to enable the pump 34 to return the vehicle to the level of the ground and to raise the auxiliary wheel and axle assemblies upwardly above the level of the ground. During the vertical movement of the wheel and axle assembly, the engine may constantly drive the output shafts 42 from the gear boxes 40, in the direction selected by the position of the handle 66, to cause the vehicle to move laterally in the desired direction. Therefore, complete control is maintained by the vehicle at all times.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. Power operated apparatus for parking vehicles having a transmission unit comprising, in combination, a pair of auxiliary wheel and axle assemblies, one for side of the vehicle, each said wheel and axle assembly extending normal to the main wheel and axle assemblies of the vehicle, guide means supporting each wheel and axle assembly upon the underframe of the vehicle for reciprocating vertical movement between opposite extreme positions, actuating means for each assembly selectively extending each auxiliary wheel and axle assembly into engagement with the ground and for elevating the frame of the vehicle relative thereto, drive means for each assembly selectively rotating a corresponding one of said auxiliary wheel and axle assemblies to move the vehicle laterally with respect to the longitudinal axis of the vehicle along the ground, each said actuating means comprising a hydraulic cylinder supported upon the corresponding side of the vehicle underframe, a piston slidably supported within each said hydraulic cylinder, a piston rod connected at opposite ends to said piston and to the corresponding auxiliary wheel and axle assembly, each of said guide means comprising a pair of bushings carried by the vehicle underframe, and guide rods secured to corresponding wheel and axle assemblies and slidably received within corresponding bushings for guiding said auxiliary wheel and axle assemblies for vertical movement relative to the vehicle underframe, each of said drive means comprising a gear box, each of said gear boxes being secured to a corresponding side of said transmission unit, and power transmission means associated with each said gear box transmitting power to each auxiliary wheel and axle assembly from the vehicle transmission unit.

2. Power operated apparatus as set forth in claim 1, wherein said power transmission means comprises an output shaft rotatably carried by each said gear box, and bevel gears acting between said output shaft and each one of said auxiliary wheel and axle assemblies for effecting rotation thereof in response to actuation of the vehicle transmission unit.

3. Power operated apparatus as set forth in claim 2, wherein said power transmission means further comprises an intermediate connecting drive shaft slidably carried by the vehicle underframe and having gear means at opposite ends drivingly connecting each said auxiliary wheel and axle assembly to said output shaft of each said gear box in all positions of said wheel and axle assemblies during actuation of said transmission unit.

References Cited in the file of this patent
UNITED STATES PATENTS

| | | |
|---|---|---|
| 1,944,501 | Dounis et al. | Jan. 23, 1934 |
| 2,212,327 | Schafer | Aug. 20, 1940 |
| 2,840,174 | Rector | Feb. 25, 1955 |

FOREIGN PATENTS

| | | |
|---|---|---|
| 1,129,095 | France | Sept. 3, 1956 |